J. S. DURNING.
GARDENING IMPLEMENT.
APPLICATION FILED JUNE 4, 1908.
920,933.
Patented May 11, 1909.
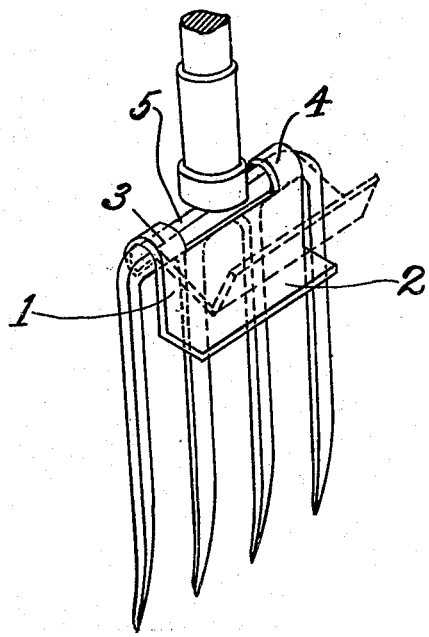
WITNESSES:
INVENTOR
Joseph S. Durning.
BY
ATTORNEYS

UNITED STATES PATENT OFFICE.

JOSEPH S. DURNING, OF AVALON, PENNSYLVANIA.

GARDENING IMPLEMENT.

No. 920,933.  Specification of Letters Patent.  Patented May 11, 1909.

Application filed June 4, 1908. Serial No. 436,630.

*To all whom it may concern:*

Be it known that I, JOSEPH S. DURNING, a citizen of the United States, residing at Avalon, in the county of Allegheny and State of Pennsylvania, have invented certain new and useful Improvements in and Connected with Gardening Implements, of which the following is a specification.

This invention relates to gardening implements; and has for its object to provide means whereby the power applied to an implement of this nature, may be brought to bear more efficiently upon the work.

A more particular object of this invention is to provide a fulcrum by means of which an implement can be manipulated with much less effort than is required with gardening tools of the present well-known construction.

Another object of my invention, is to adapt my improvement for attachment to implements of well-known type at present on the market.

Other and further objects will appear in the following specification and be more particularly pointed out in the appended claims.

The drawing is a view in perspective of a spading fork provided with my improvement in the form of an attachment therefor.

In the preferred embodiment of my invention which is illustrated in the drawing, a swinging attachment for spading forks and other implements of a similar nature, is provided. This attachment which is adapted to be connected with the spading fork in the manner shown in the figure, is preferably constructed in one piece from some stiff metal, and comprises a flat body portion 1 provided below with a broad flat foot 2 bent at right angles thereto, and above, with the projecting ears 3 and 4 bent circularly to form a bearing for swingingly mounting the attachment on the cross-rib 5 of the spading fork.

In the use of an implement provided with my improvement, the device enables the manipulator to secure better leverage and greater ease in attacking his work; it also furnishes him with additional means for forcing the implement down into the earth as well as an efficient means for steadying the same when forcing the dirt or weeds upwardly. Thus when the implement is being forced downwardly into the earth, the L-shaped support provides a ready purchase for the foot intermediate between the ground and the cross-rib of the fork. The tool having been forced down into the soil until the broad flat foot 2 rests upon the ground, the handle is forced downwardly and the fork end raised during which movement, the fork is pivotally supported on a fulcrum above the ground, the turning axis being approximately coincident with the axis of the cross-rib of the fork.

My improved attachment is preferably made of malleable cast iron properly hardened or of any suitable cast metal of sufficient rigidity. It is readily attached to and detached from the implement whenever desired.

While I have shown and described a certain preferable construction for embodying my invention, it is evident that many slight changes might be made therein without departing from the spirit of my invention.

Having thus described the nature of my invention, the following is what I claim as new and desire to secure by Letters Patent:

1. A sheet metal attachment for spading forks consisting of a rectangular sheet of metal having one edge thereof bent at right angles to form a broad flat foot for resting upon the ground and having a rectangular portion intermediate to the ends cut from the opposite edge thereof, the projecting strips left by said cut-out portion being circularly bent to form ears for engaging the cross-rib of the fork.

2. A sheet metal attachment for forks consisting of an integral sheet bent at right angles along one edge and having projecting ears of less width than the distance between adjacent tines of the fork, said ears being circularly bent to attach said attachment swingingly to the cross-rib of the fork.

3. A swinging fulcrum for gardening forks consisting of an integral sheet metal body having one edge bent at right angles and the other edge provided with circularly bent ears for engaging the cross-rib of the fork.

4. The combination with a gardening implement, of a depending foot of approximately uniform thickness throughout, said foot being bent at right angles along one edge, said bent portion being the widest part of the foot but of less width than the width of the head of the implement.

5. The combination with a garden implement; of a depending foot of uniform thickness and having its greatest width less than the width of the head of the implement, said foot having its widest portion bent at right angles to form a broad surface for supporting the implement above the ground and means for swingingly mounting the foot on said implement.

The foregoing specification signed at Allegheny, Penna., this 22nd day of May, 1908.

JOSEPH S. DURNING.

In presence of two witnesses:
G. W. H. CANDLESS,
THEO. SCHLEID.